United States Patent
Maurer et al.

[15] 3,654,549
[45] Apr. 4, 1972

[54] APPARATUS FOR INDUCTIVELY MONITORING THE MOVEMENT OF A PISTON WITHIN A CYLINDER OF AN INJECTION MOLDING MACHINE

[72] Inventors: Ludwig Maurer, Emmendingen, Germany; Jurg Von Ruti, Villars-sur-Glane, Switzerland

[73] Assignee: Maurer & Co., Zug, Switzerland

[22] Filed: Dec. 30, 1968

[21] Appl. No.: 787,803

[30] Foreign Application Priority Data

Dec. 30, 1967 Germany ................. P 16 23 787.9

[52] U.S. Cl. ........................... 324/34 D, 336/45, 336/130, 340/195, 340/282
[51] Int. Cl. ........................................................ G01r 33/00
[58] Field of Search .................. 324/34 PS, 34 D; 73/313; 336/179, 30, 45, 130; 340/195, 282

[56] References Cited

UNITED STATES PATENTS

| | | | |
|---|---|---|---|
| 2,564,221 | 8/1951 | Hornfeck | 324/34 |
| 2,569,106 | 9/1951 | James et al. | 73/313 |
| 2,999,214 | 9/1961 | Bradmiller | 336/179 |
| 3,020,527 | 2/1962 | MacLaren | 324/40 |
| 3,030,574 | 4/1962 | Nissenson | 324/34 |
| 3,378,763 | 4/1968 | Hastings | 324/40 |

FOREIGN PATENTS OR APPLICATIONS

| | | | |
|---|---|---|---|
| 1,088,544 | 10/1967 | Great Britain | 324/34 |

*Primary Examiner*—Rudolph V. Rolinec
*Assistant Examiner*—R. J. Corcoran
*Attorney*—Arthur O. Klein

[57] ABSTRACT

A method and apparatus wherein the movement of a cylinder and piston, one with respect to the other, is measured. The measurement is carried out by way of a transducer which converts the relative movement into an electrical magnitude. The transducer includes a piston component fixed to the piston so as to move therewith, this piston being formed in the interior of the cylinder with an axial bore. The transducer also has a cylinder component which is maintained at a location which does not change with respect to the cylinder and which extends at least in part into the bore of the piston, this latter component of the transducer being coaxial with the piston.

4 Claims, 13 Drawing Figures

Inventors:
Ludwig MAURER
Jürg von RÜTI
by: Arthur O. Klein
their Attorney

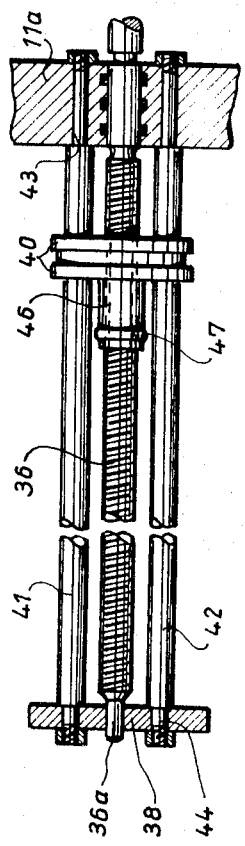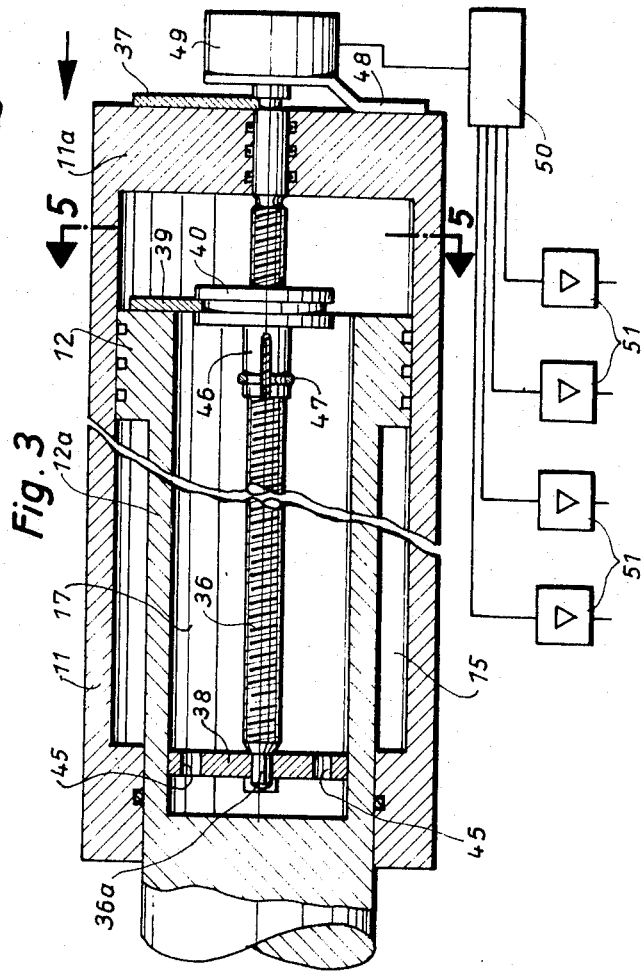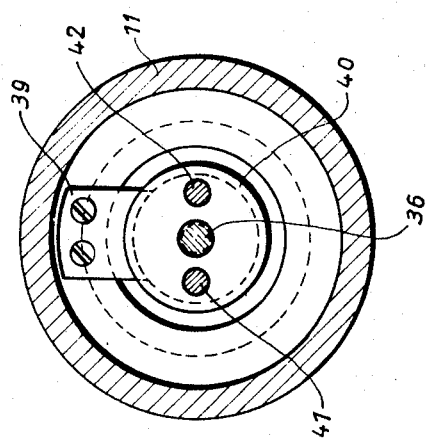

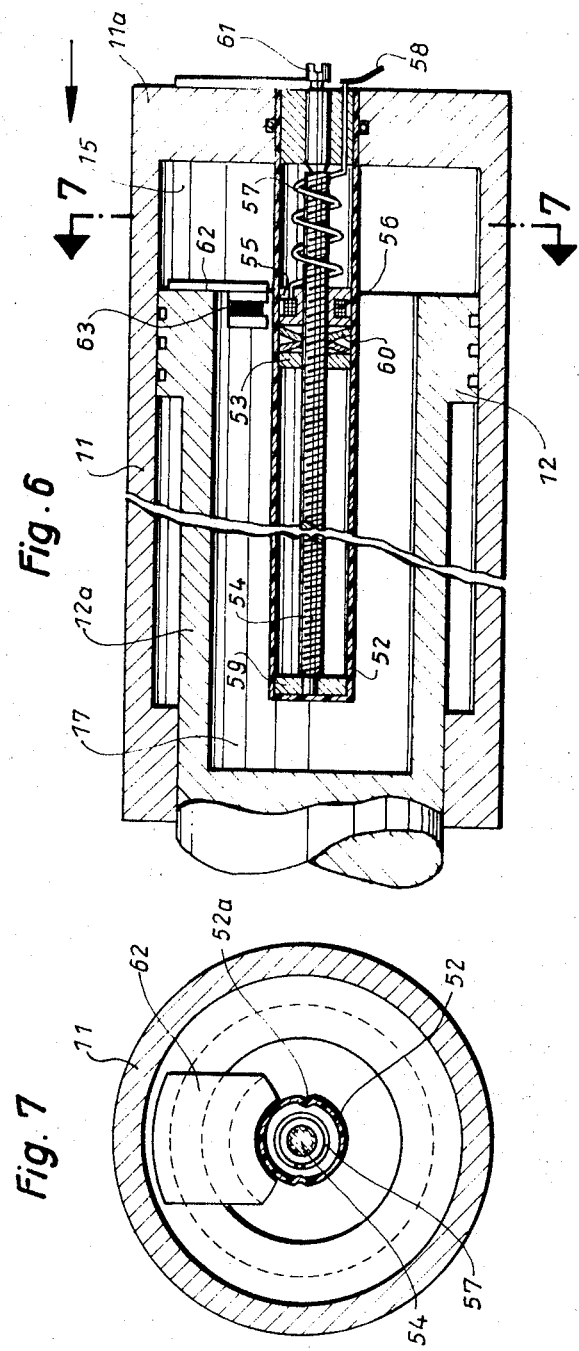

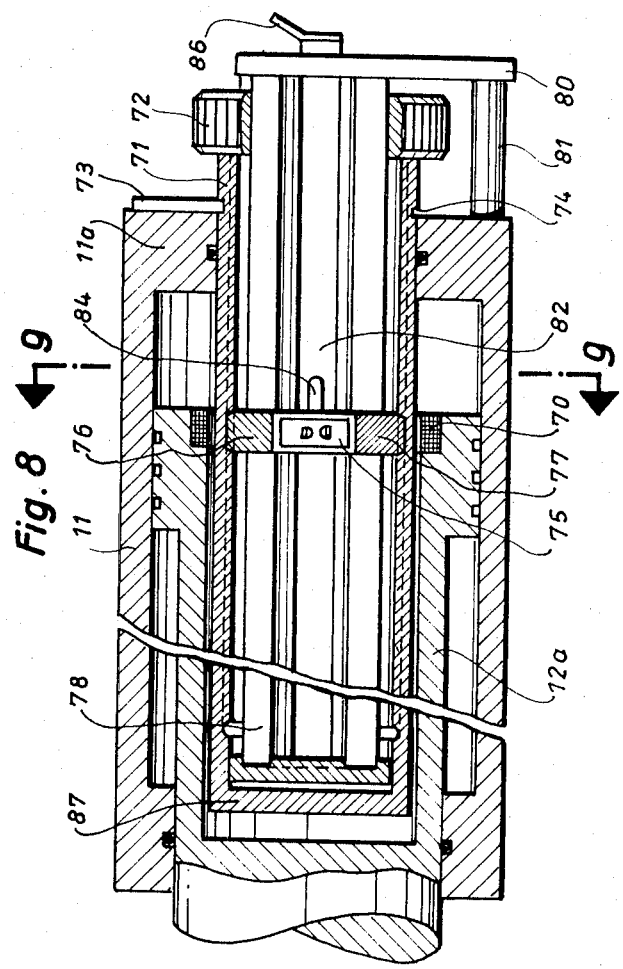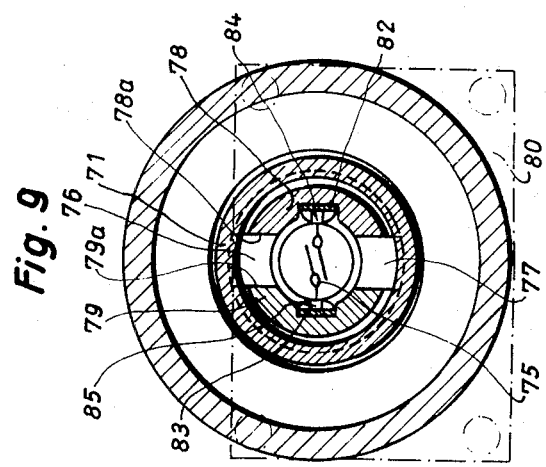

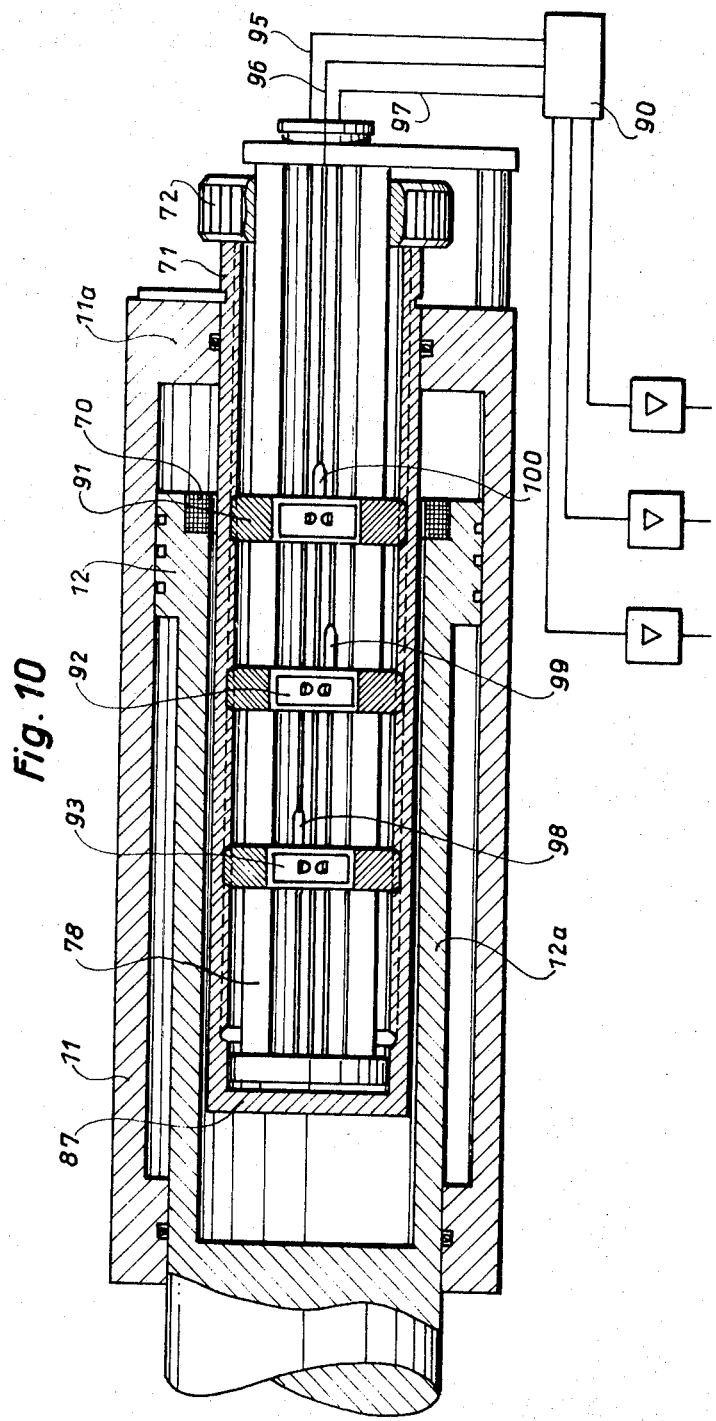

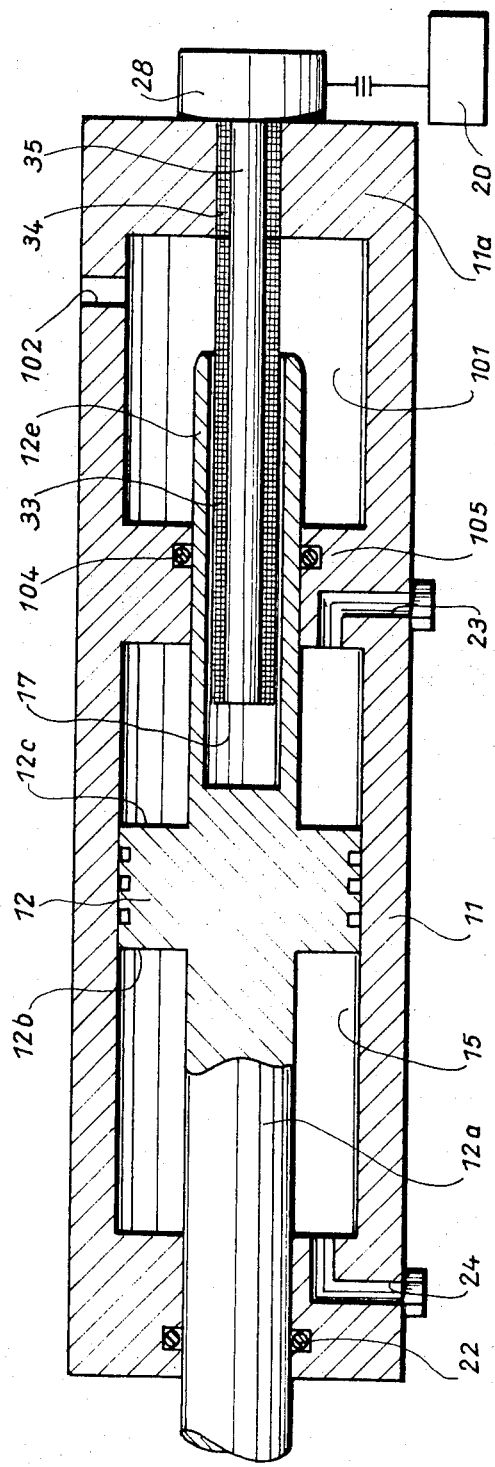

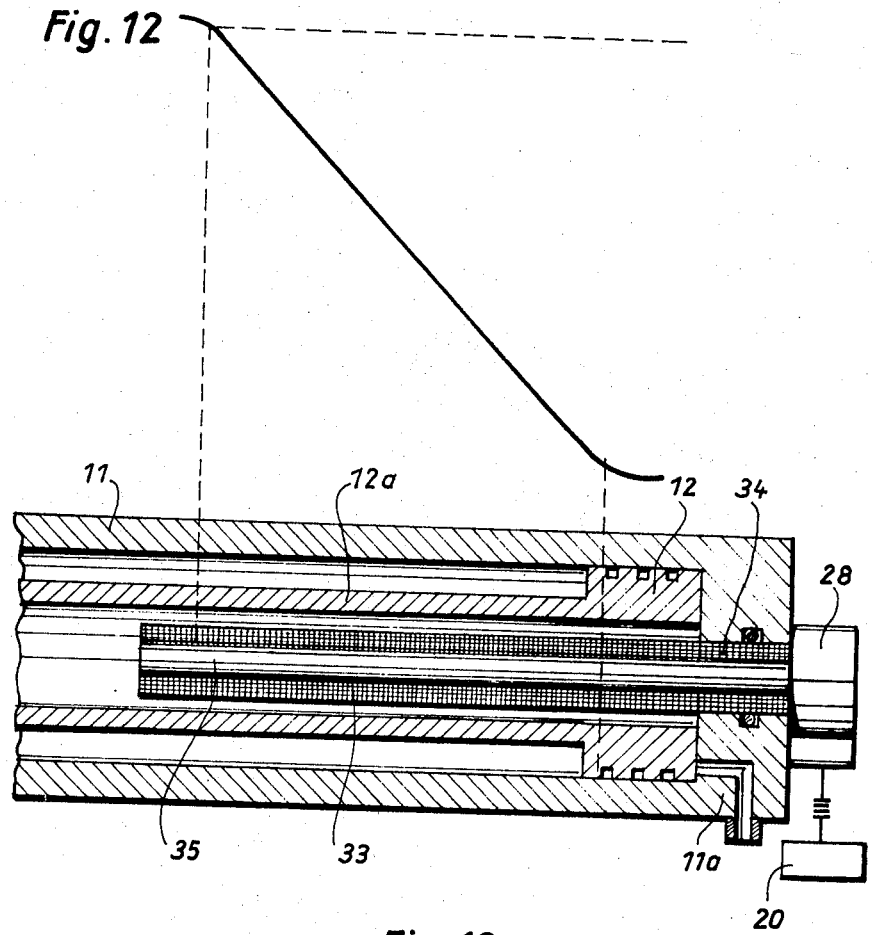
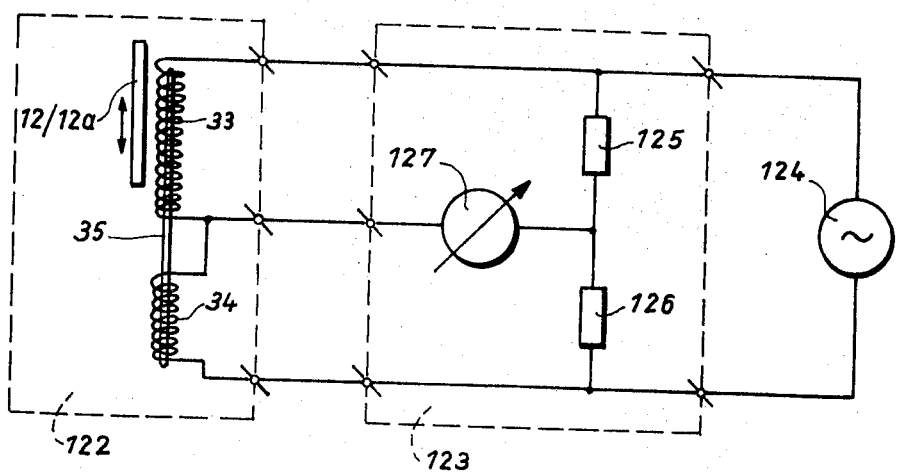

APPARATUS FOR INDUCTIVELY MONITORING THE MOVEMENT OF A PISTON WITHIN A CYLINDER OF AN INJECTION MOLDING MACHINE

BACKGROUND OF THE INVENTION

The present invention relates to a method and apparatus for measuring the extent of movement of a displaceable member of a cylinder and piston unit which is subject to the action of a fluid under pressure.

A device of this latter type may be used with an injection molding machine.

In particular, the present invention uses an electrical and/or magnetic measurement transducer for converting the piston movement into an electrical magnitude.

It is known to control the movement of an operating cylinder by way of mechanical and/or electrical devices. The stroke along which the cylinder moves is determined at the beginning and end positions thereof as well as at any desired number of intermediate positions, with the movement being changed in accordance with the speed or pressure. Often the measurement of the movement is carried out in such a way that the machine component is actuated at one or more locations along the path of movement by way of electrical contacts actuated with mechanical parts, so that in this way, for example, the flow of the pressure fluid into or out of the pressure cylinder is controlled. The measuring components are, with the known devices, situated at the exterior of the pressure cylinder and thus require additional space. Moreover, these components are easily accessible and therefore are subjected to a particularly intense wear. Thus, it is known to use, for the purpose of measuring the extent of movement, a device utilizing a lever mechanism for controlling the depth to which a metal component extends into a coil. The electrical devices must be shielded by protective devices, with the constructions known up to the present time.

In order to be able to measure relatively large movements, inductive movement measurements are known where the axial displacement of an armature and coil one with respect to the other is utilized in a device which includes a cylindrical coil along the axis of which a core of ferromagnetic material is shifted. For the most part a pair of coaxial coils are used, these coils being connected into an alternating current measuring bridge circuit as a pair of branches thereof, so that the change in the electrical magnitude resulting from the movement of the armature is measured in accordance with the differential coil principle. Such measurements of movement and elongation with an armature arrangement of this type have the disadvantage of requiring an extremely large measuring path, so that the use of such an arrangement, for measuring the movement of a piston in a hydraulic or pneumatic cylinder, for example, can only be carried out in a highly undesirable manner.

In order to measure the movement of a piston, a signal transmitter of short length is desired, so that the requirement of locating any part of the signal transmitter at the exterior of the cylinder is reduced as much as possible inasmuch as, during operation any components at the exterior of the cylinder are easily damaged. Moreover, it is of disadvantage with this type of signal transmitter to require for the measurement a relatively thin and long movable core which creates mechanical difficulties during very rapid movement of the operating piston and when operating at relatively high pressures.

There are known inductive measurement magnitude transducers which have a very varied construction in accordance with the magnitude of the measurement and the use to be made thereof. Thus, with one known force-measuring unit there is used, for example, the bending of a bendable plate or the compression of a cylinder to provide the sources of electrical measurement magnitudes. With an arrangement of this latter type the signal-transmitting components are situated at the exterior of the pressure chamber or the path along which the force moves.

SUMMARY OF THE INVENTION

It is thus a primary object of the present invention to provide a relatively simple method and apparatus for measuring the extent of movement of a cylinder component and piston component one with the respect to the other.

In particular it is an object of the invention to make it possible to measure a relatively large, extensive movement in such a way that it is possible to achieve over the greatest part of the path of movement a very good linear relationship between the measurement signal and the path of movement.

Also, it is an object of the invention to provide a construction which is exceedingly robust as well as simple.

In particular, it is an object of the invention to provide a construction which makes use of the movable piston itself as one component of a measurement transducer while making it possible to situate another component of the measuring transducer directly within the interior of a cylinder.

Thus, with an arrangement of this latter type it is the piston itself which, when carrying out the movement which is to be measured, serves directly as a component of the measuring transducer, or at least as a carrier for such a component which together with the piston forms a movable piston means.

It is therefore a further object of the present invention to provide a measurement transducer which can have an arrangement according to which it is situated substantially in its entirety in the interior of a hollow cylinder of a cylinder-and-piston unit. Thus, it is possible to eliminate the location of any components at the exterior where they can easily be damaged or can be otherwise of disadvantage.

There are known methods for measuring the pressure within a cylinder according to which the instantaneous cylinder pressure is converted by an inductive transmitter into an electrical potentional which is proportional to the pressure. However, the structure used for such a measurement is extremely complex inasmuch as the pressure transmitter utilizes piezoelectric and photosensitive switch elements which are controlled by a movement impulse transmitter operated by the piston which is within the cylinder. The inductive pressure signal transmitter is threaded onto the cylinder so that all of the signal transmitting components are arranged at the exterior of the cylinder. Such an arrangement cannot produce any excitation in response to a movement within the operating cylinder.

In contrast, it is an object of the present invention to provide an excitation in response to movement of a component in the interior of a cylinder.

According to one of the features of the invention, a component of the measurement transducer has a predetermined unchanging position with respect to the cylinder and is coaxially arranged with respect to a piston situated within the cylinder, this piston being formed with an axial bore into which the cylinder component of the transducer extends. Thus, all of the measurements are carried out within the interior of the cylinder so that while making use of the full scope of the piston there is practically no enlargement required for the operating cylinder or the machine.

Thus, it is an object of the invention to provide a construction which does not require any additional space for the components of the invention.

Yet another object of the invention is to provide a construction capable of being electronically regulated with a piston which has opposed effective areas of equal magnitude so that the amount of oil which flows into the cylinder on one side of the piston within a given time equals the amount of the oil which flows out of the cylinder from the other side of the piston during the same time.

Furthermore it is an object of the invention to provide, particularly for a construction of this latter type, an arrangement according to which that part of the piston which coacts with the transducer structure is maintained at atmospheric pressure so as to be insulated from the influence of the pressure fluid acting on the piston.

Thus, it is an object of the invention to provide a construction where the electrical components of the measurement transducer are situated at a location where they are not subject to the influence of temperature and pressure of the pressure fluid.

It is thus an object of the invention to provide a construction where a piston means itself forms part of the measurement transducer and coacts with another transducer component fixed to a cylinder means. For example, it has proved to be of advantage to provide a construction where the piston itself acts as a core with respect to a coil carried by the cylinder.

Furthermore, it is an object of the invention to provide a construction which does not make a linear movement essential but instead can utilize an arrangement according to which a linear movement of the piston is converted into a rotary movement of a mechanical element capable of converting angular movement into an electrical signal signifying a given electrical magnitude.

Yet another object of the present invention is to provide a construction according to which the built-in measuring structure is capable not only of measuring a continuously changing electrical or magnetic magnitude, but also a construction where it is possible to provide stepwise electrical measurement magnitudes depending upon the extent of movement of the piston. For this latter purpose it is possible to provide, for example, contact relays in the interior of the cylinder which are capable of achieving a measurable electrical magnitude by way of a stop which moves with the piston in a mechanical manner or by way of an electrical or magnetic field which changes with movement of the piston.

It is also an object of the invention to provide a construction enabling adjustments to be carried out from the exterior of the cylinder. In this connection it is unimportant which of the measurement magnitude influencing components are adjusted.

It is also an object of the present invention to provide a construction which is capable of compensating for temperature changes in the components. For example, in the case where a pair of coils are situated one after the other, such coils may be oppositely wound, although other temperature compensating components can be used.

Furthermore, it is an object of the present invention to provide a construction which will avoid any undesirable buildup of pressure, as, for example, by providing pressure equalizing openings, so that there will be no pressure buildup which could undesirably influence or injure the electrical measuring components.

While in the specific structures described below, one part of the signal transmitter is primarily disclosed as being arranged at a flange or end part of the operating cylinder while the other part of the transmitter is situated in a closed bore of the piston, it is also possible to provide a construction where the signal-transmitting components are situated, for example, in a special bore formed in the wall of the cylinder.

BRIEF DESCRIPTION OF DRAWINGS

The invention is illustrated by way of example in the accompanying drawings which form part of this application and in which:

FIG. 3 is a fragmentary longitudinal sectional elevation schematically illustrating a further embodiment;

FIG. 4 is a partly sectional fragmentary longitudinal elevation of the structure of FIG. 3 taken in a plane different from that of FIG. 3;

FIG. 5 is a transverse section of the structure of FIG. 3 taken along line 5—5 of FIG. 3 in the direction of the arrows;

FIG. 6 is a fragmentary longitudinal sectional elevation of a further embodiment of a structure of the invention;

FIG. 7 is a transverse section of the structure of FIG. 6 taken along line 7—7 of FIG. 6 in the direction of the arrows;

FIG. 8 is a fragmentary partly schematic longitudinal sectional elevation of yet another embodiment of a structure according to the invention;

FIG. 9 is a transverse section taken along line 9—9 of FIG. 8 in the direction of the arrows;

FIG. 10 is a fragmentary longitudinal sectional elevation of a still further embodiment of the invention;

FIG. 11 is a longitudinal section of a variation of the embodiment of FIG. 2;

FIG. 12 is a schematic diagram of the measuring signals as related to the piston movement; and FIG. 13 is a wiring diagram of the electrical interconnections.

DESCRIPTION OF PREFERRED EMBODIMENTS

Figure 1:
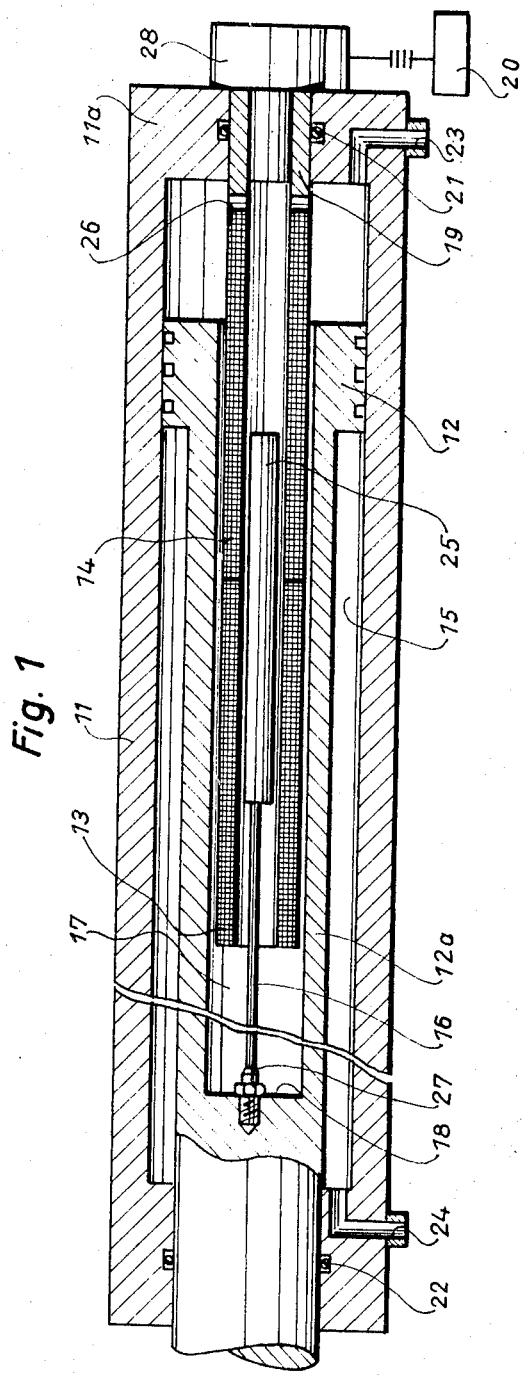
FIG. 1 is a partly schematic fragmentary longitudinal section of one embodiment of a piston-and-cylinder unit provided with the structure of the invention.

Referring now to FIG. 1 there is illustrated therein a conventional operating cylinder means 11 having a hollow interior 15 which receives a piston means 12 provided with a piston rod 12a. The piston means 12 is formed with an axial bore 17 which is closed at its inner left end 18, as viewed in FIG. 1. At this end 18 of the bore 17 a fastener 27 fixes to the piston an elongated rod 16 which forms part of the piston means 12 and which extends along the axis of the bore 17. Distant from the bore end 18, the rod 16 carries a core 25 of a coil, this core 25 also forming part of the piston means. The rod 16 is made of a non-magnetic material.

The core 25 forms a piston component of a measurement transducer means, and this latter means includes a cylinder component which in the example of FIG. 1 is made up of a pair of coils 13 and 14 arranged in end-to-end relation one after the other and fixedly carried by the cylinder means 11 by way of a holding member 19 fixed to the end 11a of the cylinder means 11 and carrying the coils 13 and 14. The holding member 19 has a fluid-tight connection with the cylinder means by way of a sealing ring 21. When fluid under pressure is admitted through one or the other of the inlet bores 23 and 24, there will be an axial movement of the piston means 12 with respect to the cylinder means 11, resulting also in a relative movement of the core 25 with respect to the coils 13 and 14. The result is a change in the electrical value taken from the coils, so that the extent of change of the electrically measured magnitude is directly dependent upon the extent of movement of the piston means 12 and cylinder means 13, one with respect to the other. It is therefore possible to provide predetermined electrical values corresponding to predetermined positions of the piston means with respect to the cylinder means, so that in this way it is possible to reproduce certain operations. The electrical supply for the coils 13 and 14 is brought about by way of a plug 28 electrically connected with an electrical switch box 20. Between the cylinder end wall 11a and the coil 14 are pressure-equalizing openings 26 providing free communication between the interior and exterior of the coils and situated between the core 25 and the cylinder so that equal pressure will exist all around the transducer means 25, 13, 14 during axial movement of the cylinder means and piston means one with respect to the other. In addition to the seal 21 there is also, at the opposite end of the cylinder means, a sealing ring 22 surrounding the piston rod 12a.

In the figures which follow and which are described below the same components are indicated with the same reference characters as those used in FIG. 1. According to the embodiment of FIG. 2 the transducer means includes as part of its cylinder component, a core 35 made of a magnetically neutral or of a ferromagnetic material, this core extending into a bore of the end wall 11a of the cylinder means 11 and being held stationary with respect to the end wall 11a. At the region of the bore in the end wall 11a the core 35 is surrounded by a coil 34 which has a fluid-tight mounting in the cylinder means by way of the sealing ring 21. A further coil 33 which extends longitudinally beyond the coil 34 surrounds the remainder of the coil core 35, so that these components 33-35 have a predetermined unchanged location with respect to the cylinder means and form the cylinder component of the transducer means. The coils 34 is situated beyond the range of movement of the piston means 12 which in this case acts as an outer core of the transducer means. Thus, a part of the piston itself forms the piston component of the transducer means. In this way a good linearity between the measurement signal derived from the structure and the movement which is measured can be achieved.

The piston 12 and its piston rod 12a are with this embodiment formed of ferromagnetic material. In order to intensify the measuring operation and to increase the accuracy of the measurement, the piston can be provided at the surface thereof which defines the bore 17 with a sleeve of good magnetic properties, such as soft iron, this sleeve covering the surface of the piston which defines the bore 17. If the pressure medium is introduced through one or the other of the inlet openings 23 and 24 into the cylinder chamber 15, there will take place a movement of the piston means with respect to the cylinder means producing an induction, at every axial position of the piston means with respect to the cylinder means, corresponding to a predetermined electrical value taken from the coils. This embodiment of FIG. 2 has with respect to the embodiment of FIG. 1 the advantage of eliminating the rod 16 which is subjected to relatively great mechanical stresses.

Known methods may be relied upon to eliminate the influence of temperature changes of the fluid pressure medium and the pressure in the cylinder which could act as resistance changers in order to provide false measurements. For example, the coils 33 and 34 may be wound in opposite directions. Also in the case of FIG. 1 the coils 13 and 14 may be wound in opposite directions, respectively. With the embodiment of FIG. 2 the coil 34 takes over the role of compensating for temperature influences. However, it is possible to use instead other known compensating components.

With the embodiments shown in FIGS. 3-5 an axial displacement of the piston means with respect to the cylinder means will result in a rotary movement of a spindle 36 which forms the cylinder component of the transducer means of this embodiment. The number of revolutions of the spindle has a predetermined ratio with respect to the extent of movement of the piston. For this purpose, the spindle 36 of the transducer means is supported for rotary movement in the end wall 11a of the cylinder means 11 and has a fluid-tight mounting therein. Axial shifting of the spindle is prevented by a plate 37 fixed to the exterior surface of the end wall 11a and extending into an annular groove which is formed in that part of the spindle which extends slightly beyond the cylinder 11. The spindle 36 is coaxially arranged within and extends along the axis of the bore 17 of the piston means, and the inner end 36a of the spindle is situated in a mating bore formed in a bearing disc 38 so as to be journalled therein. The bearing disc 38 has a slidable engagement with the piston means in the bore 17 thereof so that the piston means can freely shift axially with respect to the bearing disc 38. The end of the piston means which is within the cylinder means fixedly carries a plate 39 which is situated between a pair of nuts 40 which are threaded into engagement with each other and which are threaded onto the spindle 36.

Thus, by coacting with the plate 39 any axial movement of the nuts 40 with respect to the piston means 12 is prevented. These nuts 40 are also prevented from turning, and for this purpose rods 41 which extend parallel to the axis of the piston extend through openings of the pair of nuts 40 while slidably engaging the latter, these rods 41 and 42 having reduced portions received in bores 43 of the end wall 11a of the cylinder means and having opposed ends received in bores 44 of the bearing disc 38. Thus, upon relative axial movement between the piston means 12 and the cylinder means 11 the spindle 36 will be turned, the pitch of the threads of the spindle and nuts being sufficiently great to result in rotary movement of the spindle in response to axial movement of the nuts 40. The extent to which the spindle rotates for a given unit of axial movement of the nuts 40 or piston means 12 will be determined by the pitch of the threads. The bearing disc 38 is formed with pressure-equalizing openings 45 passing therethrough so that equal pressure prevails on both sides of the disc 38.

The left nut 40 of FIG. 3 is provided with a slotted sleeve 46 forming an extension of the left nut and urged by a springy ring 47 against the spindle. In this way the play at the threads of the spindle is reduced to a minimum. By way of the rotary movement of the spindle 36, a given number of impulses corresponding to the extent of rotary movement of the spindle is provided by way of an impulse transmitter 49 operatively connected with the spindle and mounted on the end of the cylinder at the exterior thereof by a mounting 48, this transmitter 49 transmitting the impulse signals to the impulse counter 50 which influences various different control circuits of an operating machine by way of an impulse distributor and amplifier 51.

Instead of an impulse type of signal transmitter 49, it is also possible to utilize a potentiometer of conventional construction where an electrical resistance is changed in accordance with rotary movement of the spindle 36. If necessary, there can be provided between the spindle 36 and such a potentiometer or impulse transmitter 49 a conventional gear transmission or the like capable of stepping up or stepping down the transmission ratio between the turning of the spindle and the number of counted revolutions.

According to the embodiment illustrated in FIGS. 6 and 7, the bore in the end wall 11a of the cylinder means 11 carries a tube 52 which extends coaxially and centrally into the bore 17 of the piston means. This tube 52 is closed at its inner end which is distant from the wall 11a. Also, the tube 52 is made of a non-magnetic material. In the interior of the tube 52 is a coaxially arranged adjusting spindle 54. This spindle 54 extends through a carrier plate 55 situated within the tube 52, and the carrier 55 is formed with an annular groove in which a coil 56 is accomodated. This carrier 55 of the transducer means is made of a good magnetic material, such as soft iron, and at the same time it is provided with inner threads which coact with the threads of the adjusting spindle 54. The coil 56 is electrically connected by way of the conductor 57 extending spirally around the spindle to the electrical connecting component 58 so that in this way current is supplied to the coil 56.

The inner end of the adjusting spindle 54 is journaled in a bearing disc 59. In order to reduce the extent of play between the carrier 55 and the spindle 54 a nut 53 is threaded onto the spindle 54 and a pair of cup springs 60 are situated between and resiliently press against the carrier 55 and the nut 53. In order to secure the carrier 55 and the nut 53 against rotary movement with respect to the tube 52, the latter is provided with longitudinally extending inwardly directed depressions 52a forming in effect a pair of inner ribs extending into notches formed at the exterior peripheries of the nut 53 and carrier 55, so that in this way the latter components can shift axially but cannot rotate with respect to the tube 52. This latter construction is shown most clearly in FIG. 7. The adjusting spindle 54 is turned from the exterior of the cylinder means 11 by way of an end 61 of the spindle formed with a slot for receiving the tip of a screwdriver, for example, so that upon turning of the spindle 54 the nut 53 and carrier 55 will be shifted to a selected axial position.

With this embodiment of FIG. 6 and 7 there is situated within the bore 17 of the piston means a permanent magnet 63 forming the piston component of the transducer means and fixedly carried by the piston means through a support bar 62. The permanent magnet 63 is situated close to the exterior surface of the tube 52 and has a pair of pole shoes. In order to prevent any undesirable influence on the magnetic field of the permanent magnet by way of the surrounding metal components, a sufficiently large space is maintained between the permanent magnet 63 and the surface which defines the bore 17.

When the electrical circuit is closed, the current will flow so as to generate in the coil 56 a magnetic field which can be an alternating field. The strong magnetic field generated by the magnet 63 influences the magnetic field generated by the electromagnet 56 and brings about a change in the current of the coil 56. This change depends upon the positions of the magnets with respect to each other and is thus dependent upon the piston movement. The change in the current in the coil 56 is thus capable of being used with a known structure for controlling the operating cylinder.

Instead of providing only a single cylindrical tube 52 and spindle 54 as shown in the drawings, it is possible to provide at the same time a plurality of such assemblies in the interior of the bore 17 of the piston means. By way of the adjusting component 61 the transducer means can be adjusted to take care of the special conditions which are encountered during control of a given machine part. With the position illustrated in FIG. 6, where the permanent magnet 63 has a position which is perpendicular with respect to the coil 56, the voltage which is derived at the connector 58 has a extreme value so that at this position the assembly can function as a limit switch.

A further variation of the structure of the invention is illustrated in FIGS. 8 and 9. In this embodiment the end surface of the piston means 12 is formed with an annular recess which receives a circular coil 70. The bore of the end wall 11a of the cylinder means 11 receives a tube 71 which can be turned by a knurled annular member 72 which is fixed to the tube 71. Instead of such a knurled member, it is also possible to utilize a gear which meshes with an adjusting drive. A plate 73 which is fixed to the exterior surface of the end wall 11a of the cylinder means 11 extends into an annular groove 74 formed at the exterior of the cylindrical tube 71, so as to prevent axial shifting of the latter with respect to the cylinder means.

At the region of the center of the tube 71 there is a control relay 75 also forming with the tube 71 a part of the cylinder component of the transducer means of this embodiment. The relay 75 is held and carried by a pair of holding elements 76 and 77 provided with exterior threads which coact with threads at the interior of the rotary pipe 71. Thus, when the latter is turned by way of the member 72, the relay 75 will not turn since axially extending channel members 78 and 79 prevent such turning. For this purposes these channel members 78 and 79 extend to the exterior of the cylinder means where they are fixed to a plate 80 which in turn carries spacer bars 81 fixed to the cylinder means so that in this way the channel members 78 and 79 have a fixed position with respect to the cylinder means. As is apparent from FIG. 9, electrically conductive rails 82 and 83 are situated in the interiors of the channels 78 and 79 and are electrically connected by contact springs 84 and 85 to the electrical connectors 86 situated at the exterior of the assembly.

The threaded holding members 76 and 77 are guided for longitudinal axial movement at the flat end surfaces 78a and 79a of the channel member 78 and 79 which are directed toward each other. The inner ends of the channel members 78 and 79 are supported at a bearing plate 87 with respect to which the tube 71 can freely turn, this bearing plate 87 being sitated next to the closed inner end of the internally threaded adjusting tube 71.

Thus, with this embodiment upon movement of the piston means 12 there will be a change in the intensity of the magnetic field which acts on the relay 75. At a predetermined field intensity the relay will automatically respond and closes the circuit which is connected to the operating cylinder. Instead of the illustrated annular coil 70 forming the piston component of the transducer means it is also possible to use a permanent magnet which operates in the manner described above in connection with the embodiment of FIG. 6.

With the embodiment illustrated in FIG. 10, the construction is very similar to and operates on the same principle as that of FIGS. 8 and 9. The same components are again designated by the same reference characters. However, in this case instead of a single relay 75 there are a plurality of control relays 91–93 situated within the cylindrical adjusting tubes 71 in a manner corresponding to the relay 75 described above. These relays 91–93 can be simultaneously adjusted during rotary movement of the adjusting tube 71, so that the mutual positions of the several relays with respect to each other does not change. For each of the control relays there is a given current conductor, and these conductors 95–97 are schematically illustrated. The electrical connections are made by way of slide contacts 98–100 which have a sliding engagement with slip rings of the electrical circuitry.

Upon installation of the control relays or upon determining the size of the coils, the arrangement is such that, upon movement of the piston means 12 and the coil 70 thereof, the structure will not operate to provide a simultaneous response of more than one control relay. It is, rather, intended to achieve an arrangement according to which the several relays will respond in sequence, so that a corresponding determination of the position of the piston means with respect to the cylinder means is possible. The potential values derived from the structure can in a known way be transmitted to the control and amplifying circuits 90.

In the event that the movement of the piston means within the cylinder means is to be controlled by way of an electronic control structure, then it is essential that the working surfaces of the piston means which are engaged by the pressure fluid in the pressure chamber have equal effective areas, while the amount of pressure oil or the like fed to one side of the piston within a given unit of time equals the amount of fluid discharged out of the pressure chamber from the other side of the piston within the same unit of time. For this purpose it is desirable to provide for the piston at its opposed surfaces, which can alternately be engaged by the fluid under pressure, equal effective areas, respectively.

An embodiment of this type is illustrated in FIG. 11. In this case the piston rod 12a of the piston means 12 not only carries the piston portion which is provided with the opposed working surfaces 12b and 12c of equal effective areas, but in addition the piston rod has an extension 12e extending from the the piston portion and having a cross-sectional area equal to that of the piston rod 12a. This extension 12e extends in a fluid-tight manner through a partition wall 105 which forms an integral part of the cylinder means, and the extension 12e extends into a chamber 101 which is at atmospheric pressure. A sealing ring 104 surrounds the extension 12e to maintain the chamber 101 sealed off in a fluid-tight manner from the pressure chamber 15. In order to maintain the chamber 101 at atmospheric pressure as well as to provide for free movement of air into and out of the latter, the wall of the cylinder means is formed with a bore 102 providing free communication between the outer atmosphere and the inner chamber 101.

In this case it is the extension 12e of the piston means which is formed with the axial bore 17 which receives the cylinder component of the transducer which is fixed to the end wall 11a of the cylinder means 11. In this case, as was the case with FIG. 2, the cylinder component of the transducer means includes a core 35 made of material of high magnetic permeability, this core being surrounded at the region of the bore in the end wall 11a of the cylinder means 11 by the coil 34 from which the additional coil 33 extends longitudinally into the interior of the cylinder means, along the common axis of the cylinder means and piston means, into the axial bore 17. Thus, the coil 33 surrounds that part of the core 35 which is not surrounded by the coil 34. The piston means 12, including its piston rod 12a and extension 12e are made of a magnetic, preferably ferromagnetic, material. Instead, however, it is possible to cover the surface which defines the bore 17 with a coating or covering of magnetic material. In order to compensate for temperature influences, the coils 33 and 34 are preferably wound in opposite directions, respectively.

The surfaces 12b and 12c which are engaged by the fluid under pressure have equal effective areas so that an exact control of the positioning of the operating piston is possible.

Upon adjusting the piston means 12 within the cylinder means 11 there will be an induction in the coils 33,34 with every axial position of the piston means corresponding to a predetermined electrical value taken from the coils. The electrical measuring value is transmitted by way of a plug 28 to the electrical switch device 20.

It is apparent that the electrical components of the transducer means are fully protected with this embodiment inasmuch as they are situated entirely within the chamber 101 which is at atmospheric pressure and which prevents the components of the transducer means from being subjected to the temperature and pressure of the pressure fluid.

FIG. 12 illustrates the relationship between the measuring signal and the movement of the piston means 12. In FIG. 12 the ordinate indicates, for example, a measured signal value in mV while the abscissa indicates the extent of movement in mm. As is apparent from FIG. 12, throughout the major part of the length of the measuring coil 33 there is a linear relationship between the measurement signal and the measured movement. It is only at the last part of the movement of the piston toward the end wall 11a of the cylinder means 11 that there is any variation in this linear relationship, since at this location, a minimal relationship is encountered. However, this deviation from linearity occupies only a region of approximately 10-20 percent of the length of the coil, so that by a suitable geometric arrangement of the measurement transducer relative to the measured object the entire range of movement of the piston means 12 can be located exclusively at that part of the signal where a linear relationship obtains. For example, the measuring coil 33 can be made approximately 20 percent longer than the extent of movement of the piston means which is to be measured.

Figure 2:
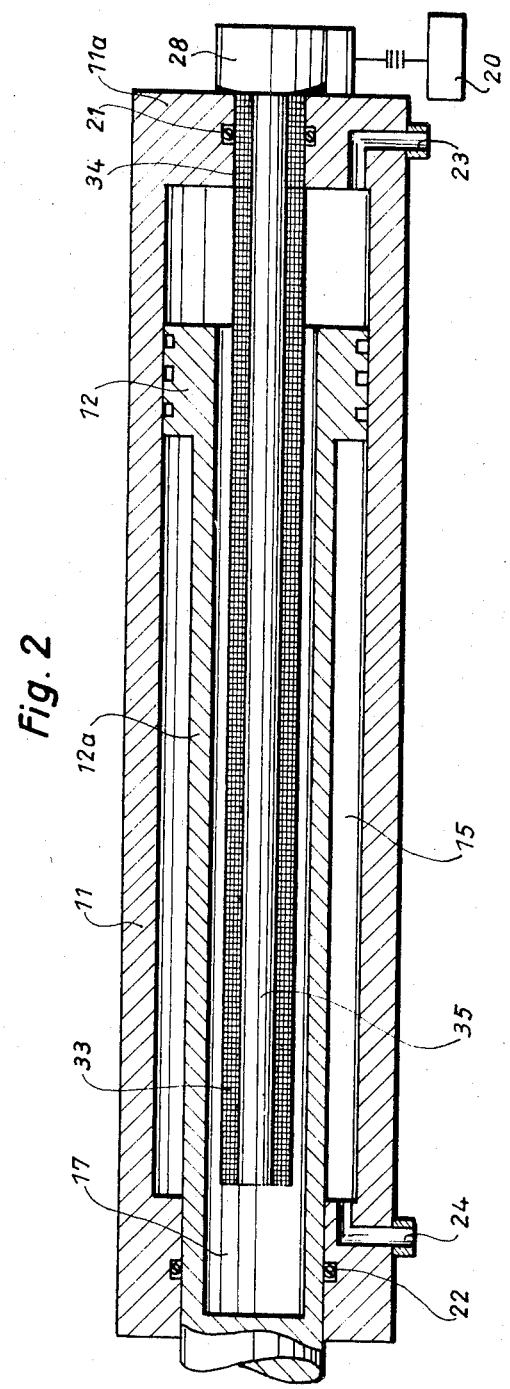
FIG. 2 is a longitudinal section elevation fragmentarily and schematically illustrating another embodiment of the invention.

With the measuring arrangement illustrated in FIG. 13, there is a measuring element 122 which essentially includes the measurement transducer structure shown in FIG. 2 and described above, this structure including the stationary core 35 and the coils 33 and 34 as well as the movable piston means 12, 12a. The coil 33 and the compensating coil 34 form a pair of adjoining branches of an alternating current bridge circuit, the other two branches of which are formed by the resistors 125 and 126, while a source of alternating current 124 is mounted in the circuit as illustrated in FIG. 13. The resistors 125 and 126 are mounted in a measuring device 123. The measuring signal, the magnitude of which depends upon the instantaneous position of the piston 12 relative to the stationary core 35 and measuring coil 33, is capable of being read at the measuring instrument 127 which measures the diagonal potential of the measuring bridge and which, for example, may take the form of a millivoltmeter. The measuring signal can of course be amplified if required, and also it can be rectified and in a known way fed to further switching assemblies.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A measuring arrangement for use in an injection molding machine having a piston means, operatively mounted in hollow cylinder means, said arrangement measuring the extent of axial movement of one of said means relative to the other in response to introduction of fluid under pressure into said cylinder means, said arrangement comprising:
   inductive measurement transducer means for converting the movement of said one of said means with respect to the other of said means into an electrical magnitude,
   said transducer means including a piston inductive component forming part of said piston means and forming a bore in said piston means, said piston inductive component being at least partially formed of ferromagnetic material, and a cylinder component having a fixed position relative to said cylinder means,
   said cylinder component including a coil axially secured to said cylinder means and a ferromagnetic core surrounded by said coil, so as to be coaxially aligned therewith,
   said coil and core extending into said bore formed by said piston inductive component,
   said piston and cylinder components having an inductive operational relationship with each other,
   said cylinder means having in its interior a partition fluid-tightly surrounding said piston means and separating in said cylinder means on one side of said partition a pressure chamber, and, in said cylinder means, on the other side of said partition, a chamber which is at atmospheric pressure, said piston means having a piston portion situated in said pressure chamber and an extension extending fluid-tightly through, said partition into said chamber which is at atmospheric pressure, the latter extension being formed with said bore and receiving said said cylinder component of said transducer means.

2. The combination of claim 1 comprising a holding member fixedly connecting said cylinder component to said cylinder means.

3. The combination of claim 1 and wherein said cylinder component includes a pair of coaxial oppositely wound coils for providing temperature compensation.

4. The combination of claim 1 and wherein said piston portion of said piston means has a pair of opposed working surfaces which are of equal effective areas.

* * * * *